United States Patent [19]

Bosc

[11] 4,185,285
[45] Jan. 22, 1980

[54] RADAR FOR THE DETECTION OF FIXED TARGETS IN CLUTTER

[75] Inventor: Henri J. Bosc, Paris, France

[73] Assignee: International Standard Electric Corporation, New York, N.Y.

[21] Appl. No.: 897,768

[22] Filed: Apr. 17, 1978

[51] Int. Cl.² .................................................. G01S 9/02
[52] U.S. Cl. ...................................................... 343/5 SA
[58] Field of Search ...................................... 343/5 SA

[56] References Cited

U.S. PATENT DOCUMENTS

| | | | |
|---|---|---|---|
| 3,343,164 | 9/1967 | Clarke | 343/5 SA X |
| 3,715,753 | 2/1973 | Applebaum et al. | 343/17.2 PC |
| 3,896,434 | 7/1975 | Sirven | 343/5 SA |
| 3,983,558 | 9/1976 | Rittenbach | 343/5 SA X |
| 4,040,057 | 8/1977 | Cross et al. | 343/5 SA X |

*Primary Examiner*—Malcolm F. Hubler
*Attorney, Agent, or Firm*—William T. O'Neill

[57] ABSTRACT

A high range resolution FM-CW radar system, having a range resolution cell on the order of the minimum distance between two highly reflective points of a target. Circuits are included for evaluating the difference between the echo intensity received from a resolution cell containing a highly reflective point of a target and that received from a resolution cell located at the same distance but containing only clutter.

5 Claims, 8 Drawing Figures

RADAR FOR THE DETECTION OF FIXED TARGETS IN CLUTTER

BACKGROUND OF THE INVENTION

This invention concerns radar systems generally and more specifically relates to enhanced detection of fixed targets in the presence of undesired echoes (clutter).

The term clutter refers to unwanted echoes such as produced by the ground, grass and foliage, and sea surface as well as atmospheric precipitation. Useful or desired echoes coming from targets of interest are often masked by clutter echoes, hence the need to separate the useful echoes from the clutter echoes. In the case of moving targets, use can be made of the Doppler effect in a number of known ways to detect them within the clutter. However, this solution is obviously not applicable to fixed targets. The manner in which the invention advances the art by providing novel means for detection of fixed targets in clutter will be described hereinafter.

SUMMARY OF THE INVENTION

The general objective of the invention may be said to have been the provision of a radar allowing fixed targets to be detected in the midst of clutter.

According to one characteristic of the invention, the radar used is a frequency-modulated, continuous-wave radar having high range resolution, on the order of the minimum distance between bright points of targets having large radar cross section. The discrimination between targets and clutter is based on the echo intensities received from a resolution cell containing a bright point of a target and a resolution cell located at the same range but containing only clutter.

Other characteristics and advantages of this invention will be brought out in the following description made in connection with the attached drawings.

DETAILED DESCRIPTION

The principle employed for detection of fixed targets (as hereinbefore summarized) in the midst of clutter is based on the observed differences between the RF diffusion characteristics of the desired targets and those of the clutter. Targets of interest (tanks, vehicles, buildings, . . . ) have edges and approximately flat surfaces defining, from the point of view of echoes, a small number of diffusers, each having a relatively large radar cross-section and separated in range on the order of one to several meters. Such a set of diffusers determines practically the total radar cross-section of the desired target.

Clutter echoes, on the contrary, generally are composed of a large number of diffusers located relatively close to each other, but each having a small radar cross-section.

According to the invention, fixed targets in the midst of clutter are detected by the radar of high range resolution, on the order of magnitude of the minimum distance between bright points of the target (diffusers having a large radar cross-section), for example on the order of one meter. Thus, the intensity of the echo received from a resolution cell containing a bright point of the target will be greater than that of an echo received from a resolution cell located at the same distance but containing only clutter.

The high-resolution radar used in the invention is of the frequency-modulated continuous-wave (FM-CW) type. The following mathematical expressions are used to determine the radar range resolution as a function of the carrier wave modulation characteristics.

We shall call:

$\phi$ the phase shift between the echo received from a point and the transmitted wave;

D the distance between the radar and the said point of reflection;

F the frequency of the transmitted wave;

c the propagation velocity; and t the time.

The phase shift $\phi$ is equal to:

$$\phi = 4\pi FD/c \qquad (1)$$

This phase shift varies as a function of time if F or D varies and results in an apparent frequency f of the echo:

$$f = (1/2\pi)(d\phi/dt).$$

This expression may be rewritten, from equation (1) as follows:

$$f = \left(\frac{2D}{c}\right)\left(\frac{dF}{dt}\right) + \left(\frac{2F}{c}\right)\left(\frac{dD}{dt}\right).$$

Limiting the discussion to fixed targets for the moment, the apparent frequency f is a function only of the transmitted wave frequency F, as follows:

$$f = (2D/c)(dF/dt).$$

Figure 1:
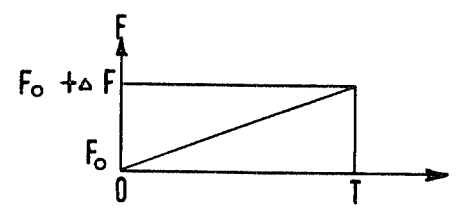
FIG. 1 depicts a typical frequency deviation curve of the signal transmitted by a frequency-modulated radar.

We shall assume that the transmitter is frequency-modulated linearly with according to a triangular wave-shape a deviation $\Delta F$ for a time T, as shown in FIG. 1. The frequency F of the transmitted wave varies linearly between values $F_o$ and $F_o + \Delta F$ during the time period T. We can then write:

$$dF/dt = \Delta F/T.$$

Whence:

$$f = (2D)(\Delta F)/cT \qquad (2)$$

And thus:

$$D = cTf/2\Delta F.$$

Range resolution, which will be called $\Delta D$, is a function of the uncertainty of measurement of the apparent frequency f. Letting $\Delta f$ be this uncertainty over the frequency f, we can write:

$$\Delta D = (cT)(\Delta f)/2\Delta F.$$

The time interval available for the measurement of f being equal to T, the uncertainty of measurement $\Delta f$ will therefore be on the order of $1/T$ if the measurement is made on a single frequency deviation. The range resolution $\Delta D$ is therefore given by:

$$\Delta D = c/2\Delta F. \tag{3}$$

For example, a range resolution $\Delta D$ of 0.5 m is obtained with a frequency deviation $\Delta F$ of 300 MHz.

The following mathematical expressions are used to determine the ratio $\alpha$ = useful signal/clutter signal. We have:

$$\alpha = \sigma/\sigma_c,$$

in which $\sigma_c$ represents the radar cross-section of the clutter in a resolution cell of size $\Delta D$ located at a distance D from the radar, and $\sigma$ represents the radar cross-section of the target in the said resolution cell.

$\sigma_c$ may be then written as $$\sigma_c = \sigma_o(d)(\theta)(\Delta D)$$

where $\sigma_o$ is the clutter density per unit area, and
$\theta$ is the bearing beamwidth of the antenna lobe.
By replacing $\Delta D$ by expression (3), we have:

$$\sigma_c = (\sigma_o)(D)(\theta)(c)/(2\Delta F).$$

Thus, $\alpha$ can be written in the form $$\alpha = \frac{(2\sigma)(\Delta F)}{(\sigma_o)(D)(\theta)(c)}. \tag{4}$$

As an example, the numerical values indicated below, when substituted into equation (4), give a useful signal/clutter signal ratio of 22.86, or 13.6 dB. These substitution example values are $\theta = 1°$ (0.0175 rad),
$\Delta F = 300$ MHz,
$\sigma_o = 0.005$ m²/m², (average vegetation)
$\sigma = 1$ m², and
$D = 1$ km.

Expression (4) can be used to calculate the minimum radar cross-section $\sigma_{min}$ of a target detectable in a resolution cell, as a function of the range for various conditions of clutter, as follows:

$$\sigma_{min.} = (\alpha)(\sigma_o)(\theta)(c)(D)/(2\Delta F).$$

Calculations have been made using the following numerical values:

$\alpha = 20$
$\theta = 1°$
$\Delta F = 300$ MHz.

Figure 2:
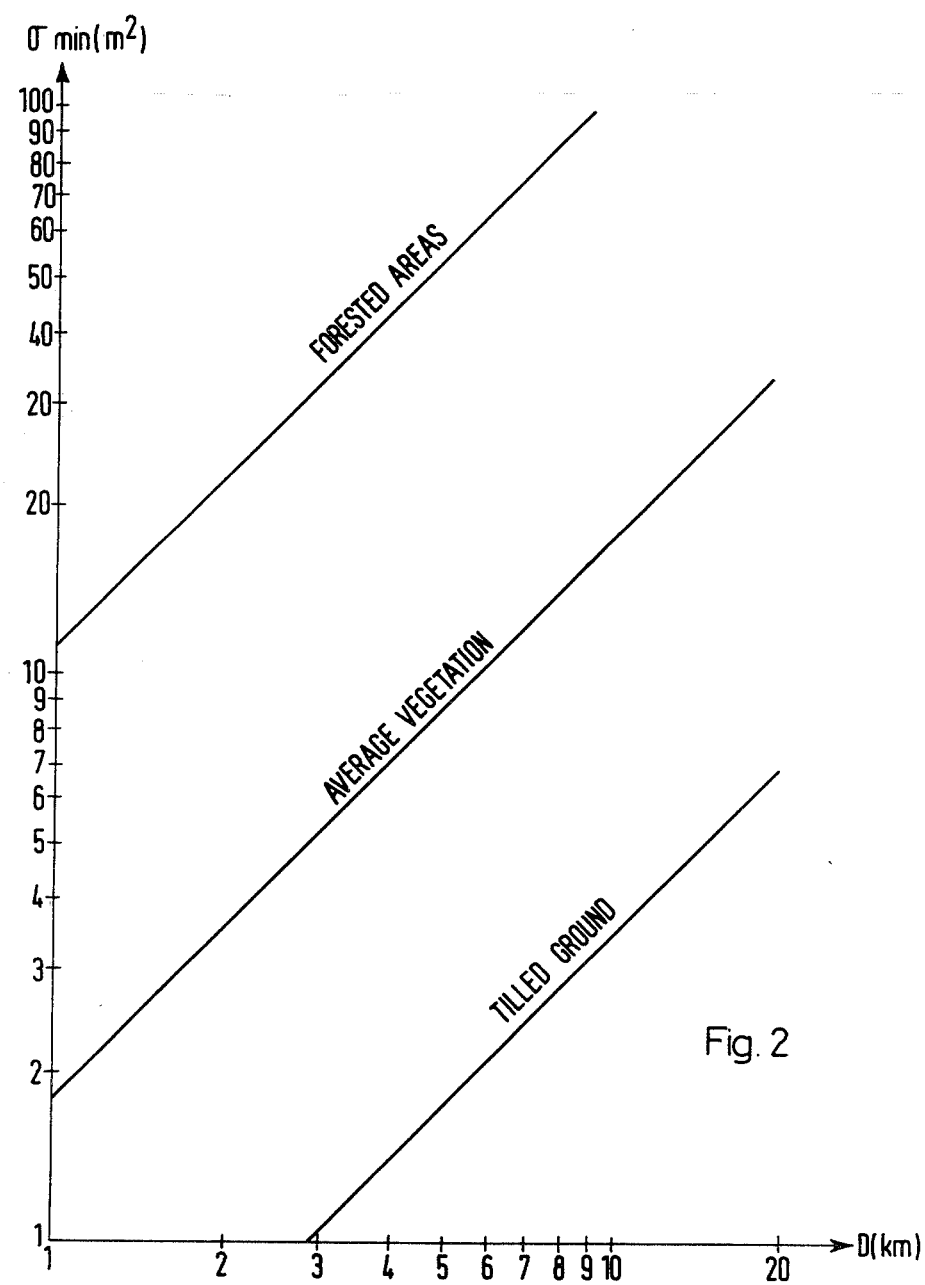
FIG. 2 is a graph indicating, for various clutter conditions, and as a function of range, the minimum target radar cross-section detectable in a resolution cell by the radar according to the invention.

The results are shown on the diagram of FIG. 2 for three different types of clutter:

| | |
|---|---|
| Tilled ground: | $\sigma_o = 0.001$ m²/m² (−30 dB); |
| Average vegetation: | $\sigma_o = 0.005$ m²/m² (−23 dB); |
| Wooded (Forested) ground: | $\sigma_o = 0.032$ m²/m² (−15 dB). |

Although moving targets can be detected, as is well known, by a Doppler radar, they will also be detected by the high-resolution radar according to the invention. The range error introduced by the Doppler effect is negligible, as will be explained below.

Consider:

$$F_D = 2v/\lambda$$

in which, $F_D$ is the Doppler frequency of the target;
v is the radial velocity of the target; and
$\lambda$ is the wavelength.

By making $\lambda$ equal to three centimeters (10 GHz), we obtain a Doppler frequency of 66 Hz for a radial velocity of 1 m/s. From the expression (2), we can calculate the range error introduced by that Doppler effect. Using $\Delta F$ equal to 300 MHz and T equal to 1 ms, we find an error of only 33 millimeters for a velocity of 1 m/s.

Figure 3:
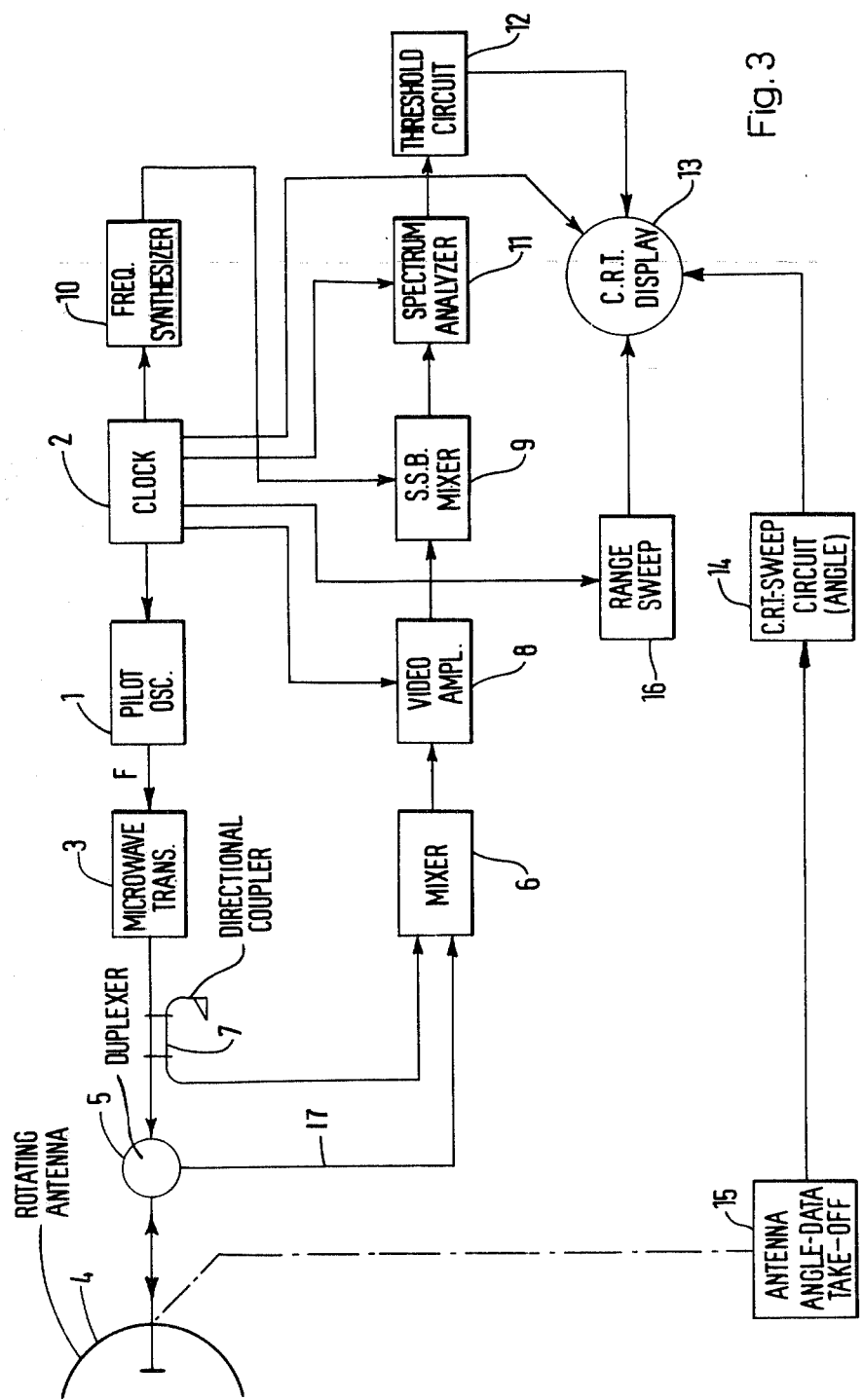
FIG. 3 shows the basic schematic block diagram of the radar according to the invention.
Figure 4:
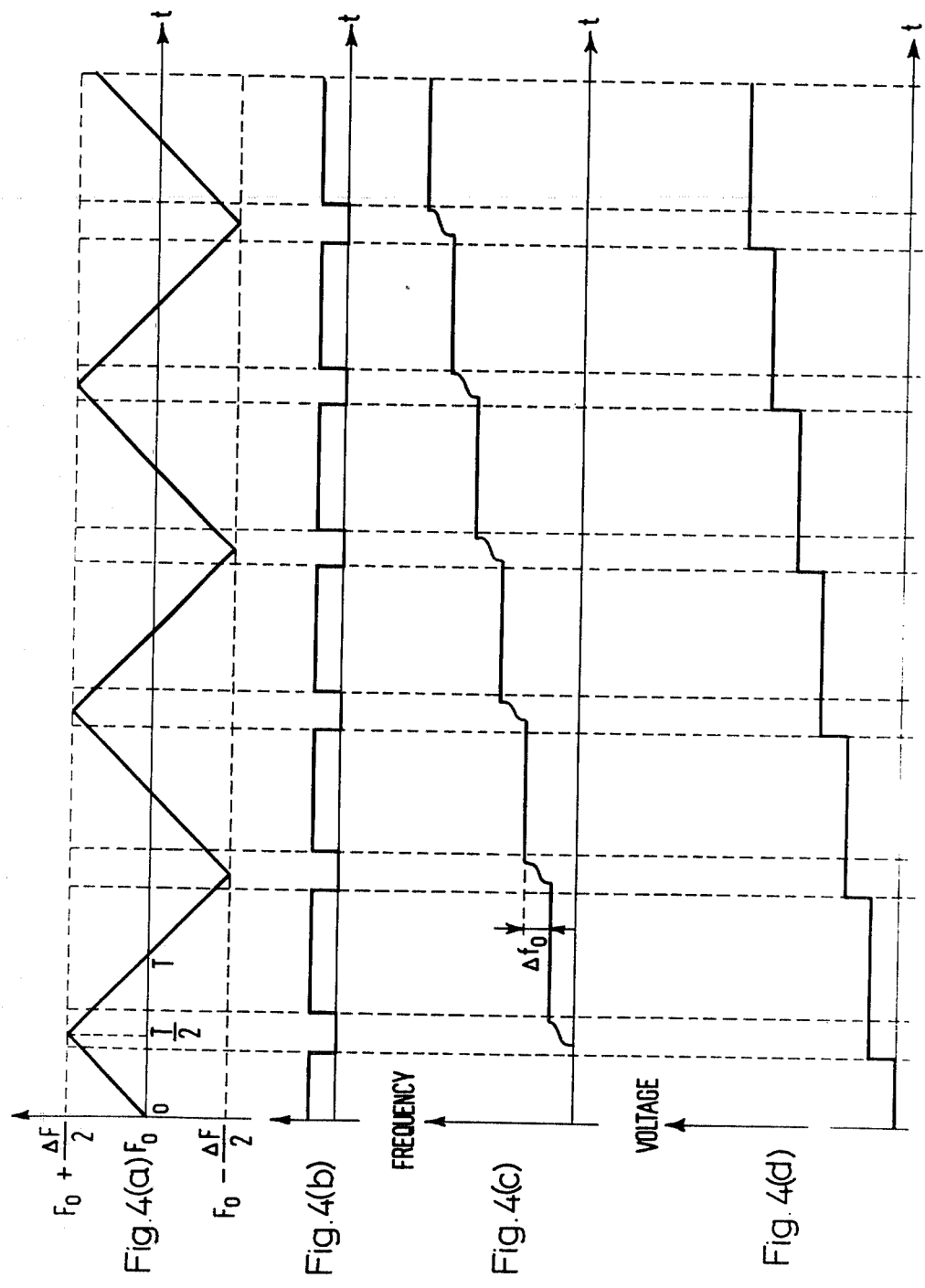
FIGS. 4(a) through 4(d) show waveforms of signals generated at selected points within the radar system according to the invention.

FIG. 3 shows the basic block diagram of the high-resolution frequency-modulated, continuous-wave radar in accordance with the principles of the invention, permitting the detection of fixed targets in the midst of clutter. It includes a pilot oscillator 1, frequency-modulated linearly under the control of a clock 2. The curve giving the value of the frequency F of oscillator 1 as a function of the time t has the shape of a triangular wave, as shown in FIG. 4(a). The frequency F varies from $F_o + \Delta F/2$ to $F_o - \Delta F/2$ over a period T. Oscillator 1 is followed by a microwave transmitter 3, for example one including a travelling-wave tube. Transmitter 3 is connected to a rotating antenna through a duplexer 5. The echoes received by the antenna 4 are delivered at output 17 of duplexer 5, and are then mixed with a fraction of the transmitted signal in a mixer 6. This fraction of the transmitted signal is tapped off by means of a directional coupler 7. The output of mixer 6 is connected to the input of a video amplifier 8 delivering a signal having a frequency equal to the difference between the transmitted frequency and the received frequency. This difference frequency is referred to as the apparent frequency f of the echo. The bandwidth of amplifier 8 is equal to the range of expected variation of the said apparent frequency, which will be called $(f_{max.} - f_{min.})$. The apparent frequency $f_{max.}$ corresponds to the maximum detection range, which will be called $D_{max.}$. The apparent frequency $f_{min.}$ corresponds to the minimum detection range, which will be called $D_{min.}$. The voltage gain of amplifier 8 is proportional to a power of the frequency, so as to provide automatic gain control as a function of the range.

The frequency f signal delivered by amplifier 8 is mixed, by means of a single-sideband mixer 9, with the output signal of a frequency synthesizer 10 whose frequency can vary from $F_o + f_{min.}$ to $F_o + f_{max.}$ in steps of $\Delta f_o$, under the control of clock 2. FIG. 4(c) shows the output frequency of synthesizer 10 as a function of time. Jumps in frequency occur when the sign of the slope of the sawtooth curve shown in FIG. 4(a) changes, and are therefore spaced by a time period T. Mixer 9 is designed to deliver a signal with a bandwidth $\Delta f_o$. The output signal from the said mixer 9 is received by a spectrum analyzer 11, controlled by clock 2. Each step $\Delta f_o$ defines a portion of distance $\Delta D_o$ within the total detection zone going from $D_{min}$ to $D_{max}$. Thus, on each frequency step of synthesizer 10, the spectrum analyzer 11 analyzes the corresponding portion of distance $\Delta D_o$. The total detection zone is analyzed by successive portions of distance $\Delta D_o$ during the frequency sweep of the synthesizer 10, this function being basically handled by clock circuit 2.

Figure 5:
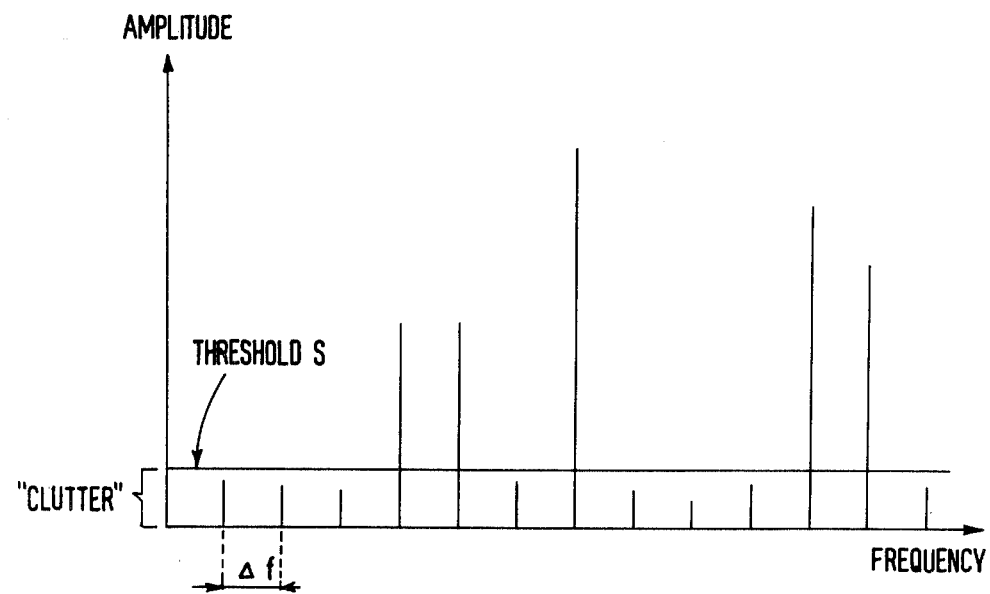
FIG. 5 shows a typical frequency spectrum corresponding to the analysis of a portion of the range covered by the radar according to the invention.

The spectrum analyzer 11 will preferably be of the digital type. Processing is delayed by a time T, this being accomplished by the expedient (known per se) of using two alternately operating memories within 11. A time T is thus available to the spectrum analyzer to deliver the frequency spectrum of a signal of bandwidth $\Delta f_o$ with a resolution equal to the frequency resolution $\Delta f$ of the radar, this frequency resolution $\Delta f$ corresponding to the range resolution $\Delta D$. The spectrum analyzer should therefore deliver, in a time T, N lines (where $N=\Delta f_o/\Delta f$) corresponding to N distances each separated by $\Delta D$ within a portion of distance $\Delta D_o$. FIG. 5 shows an example of a frequency spectrum for a given portion of the range. It can be shown that low amplitude lines correspond to clutter, and larger amplitude lines indicate a desired target, the discrimination occurring above a threshold of amplitude S.

A threshold circuit 12 (cutting off below level S), placed at the output of the spectrum analyzer 11, permits the clutter signal to be eliminated, and delivers a brightness signal to a cathode ray display 13 when the amplitude of the signal delivered by the spectrum analyzer is above the said threshold S. The electron beam of the display CRT 13 is deflected in bearing by a sweep circuit 14 controlled by an angle data take-off circuit 15 which determines the position of the antenna 4, and in range by a range sweep circuit 16 controlled by the clock 2. Blanking signals are also sent from the clock 2 to the display 13 during the bean return operation, thus the clock 2 performs as a master synchronizing circuit. Other blanking signals, shown in FIG. 4(b), are sent from clock 2 to amplifier 8 at the time of the frequency sweep reversal of oscillator 1 so as to exclude noise signals present at that moment.

The radar according to the invention can operate in two different modes:
(1) Surveillance of the total detection zone; and
(2) Fine analysis of a selected portion of distance $\Delta D_o$.
Both of these operating modes are explained below:

Surveillance of the Total Detection Zone

In the surveillance mode, antenna 4 rotates and display 13 displays the entire zone under surveillance, in bearing and in range, in the PPI mode. When a target is detected in a given portion of distance $\Delta D_o$, a signal point is illuminated on display 13 in the direction given by the position of the antenna 4, and at a range corresponding to the analyzed portion of distance $\Delta D_o$. To this end, the synthesizer 10 delivers frequencies changed by steps, as explained above and as shown in FIG. 4(c). The range sweep circuit 16 delivers step voltages, as shown in FIG. 4(d). The frequency steps of the synthesizer 10 and the voltage steps of sweep circuit 16 are synchronized. Any spectral line received by the threshold circuit 12 exceeding the threshold S will illuminate the display. All spectral lines belonging to the same portion of distance $\Delta D_o$ will illuminate the screen of the display at a single range determined by the voltage step which is supplied by the sweep circuit 16, resulting in a single bright spot on the screen. The range resolution is then $\Delta D_o$.

Fine Analysis of a Selected Portion of Distance $\Delta D_o$

Fine analysis of a portion of distance $\Delta D_o$ can indicate the number and type of targets contained in this portion. This mode of operation requires modification of some clock signals. The antenna rotation is searchlighted (brought to a stop in the chosen direction) and the selected portion of distance $\Delta D_o$ is spread over the entire screen. The frequency delivered by the synthesizer 10 is fixed and corresponds to the portion of range in question. Therefore the spectrum analyzer continuously analyzes this same portion of range. The range sweep circuit 16 supplies a sawtooth voltage corresponding to a sweep of the entire screen. Thus, each line delivered by the spectrum analyzer 11 that exceeds the threshold S will illuminate a point on the screen, at the corresponding range. The range-resolution is then equal to $\Delta D$.

Although this invention has been described in connection with a particular embodiment, it is clearly not limited to the said embodiment and is capable of variations and modifications within its inventive scope. For example, it will be evident that the conventional CRT sweep can be replaced by a television-type (raster) sweep, with the use of a buffer storage element.

What is claimed is:

1. A high resolution radar for the detection of fixed targets in clutter, comprising:
   first means associated with said radar comprising an angularly scannable antenna and means for generating and radiating a continuous-wave frequency-modulated transmitted signal, and means for receiving echo signals from targets and clutter illuminated by said transmitted signals;
   second means associated with said means for receiving echo signals and for successively selecting resolution cells in range containing echo signals corresponding to both clutter and fixed targets;
   third means responsive to said echo signals from said second means for successively producing a plurality of spectral line signals each of amplitude, each representing the magnitude of a corresponding frequency component within a given resolution cell, said spectral lines having greater amplitudes as they result from fixed targets than as resulting from clutter echoes;
   and fourth means responding substantially only to said spectral lines of greater amplitude for producing an output identifying a fixed target mixed with clutter within a corresponding resolution cell.

2. Apparatus according to claim 1 in which said frequency modulation of said transmitted signal is effected in accordance with a linearly varying frequency-versus-time function.

3. Apparatus according to claim 2 in which said frequency modulation frequency-versus-time function is a triangular wave having an envelope with substantially linear increasing and decreasing slopes.

4. Apparatus according to claim 1 further comprising cathode ray display means having range and angle scanning means synchronized with said envelope of said frequency-vesus-time function and the instantaneous angle of scan of said scannable antenna, respectively, said display means being responsive to the output of said fourth means to produce an intensified point on the screen of said display.

5. A radar system according to claim 4 in which said second means comprises means for successively analyzing at least a portion of the total useful range of said system $D_o$ by successive increments of $\Delta D_o$;

in which said second means further includes a frequency synthesizer whose frequency varies by steps of $\Delta f_o$ corresponding to the variation of the apparent frequency of target echoes over said $\Delta D_o$, said steps being spaced by time T and beginning at the time of each change of frequency slope of said frequency-versus-time modulation function;

in which a single-sideband mixer is included connected to receive the output of said frequency synthesizer and the received apparent target echo frequency f to produce a signal of bandwidth $\Delta f_o$;

and in which said third means is a spectrum analyzer responsive to said single-sideband mixer to provide, in said period T, said spectral line signals of said $\Delta f_o$, said spectral lines comprising N lines separated in frequency by $\Delta f$, which value $\Delta f$ is a function of the effective range resolution of the system $\Delta D$.

* * * * *